United States Patent [19]

Sakakibara et al.

[11] Patent Number: 4,711,214

[45] Date of Patent: * Dec. 8, 1987

[54] ANTI-KNOCKING CONTROL IN INTERNAL COMBUSTION ENGINE

[75] Inventors: Koji Sakakibara, Hekinan; Hiroshi Haraguchi; Hideki Yukumoto, both of Kariya, all of Japan

[73] Assignee: Nippondenso Co., Ltd., Kariya, Japan

[*] Notice: The portion of the term of this patent subsequent to Oct. 2, 2003 has been disclaimed.

[21] Appl. No.: 891,165

[22] Filed: Jul. 31, 1986

Related U.S. Application Data

[63] Continuation of Ser. No. 735,108, May 17, 1985, Pat. No. 4,617,895.

[30] Foreign Application Priority Data

May 17, 1984 [JP] Japan .................................. 59-99898
Dec. 13, 1984 [JP] Japan .................................. 59-264256
Mar. 4, 1985 [JP] Japan .................................. 60-43223

[51] Int. Cl.$^4$ .............................................. F02P 5/15
[52] U.S. Cl. .................................................. 123/425
[58] Field of Search ...................... 123/425, 435; 73/35

[56] References Cited

U.S. PATENT DOCUMENTS

| 4,549,513 | 10/1985 | Dovaud et al. ...................... 123/425 |
| 4,557,236 | 12/1985 | Showalter ............................ 123/425 |
| 4,617,895 | 10/1986 | Sakakibara et al. ................. 123/425 |

FOREIGN PATENT DOCUMENTS

| 46606 | 4/1976 | Japan . |
| 66661 | 5/1980 | Japan .................................. 123/425 |
| 115861 | 9/1981 | Japan . |
| 180766 | 10/1983 | Japan . |

Primary Examiner—Tony M. Argenbright
Attorney, Agent, or Firm—Cushman, Darby & Cushman

[57] ABSTRACT

In a system for controlling knocking in an internal combustion engine, a reference value to be compared with a knock sensor signal for determining the presence or absence of the knocking is corrected in accordance with the pattern of a distribution obtained by collecting the logarithmic transformation value of the maximum value of signal generated from the knock sensor signal within a predetermined engine rotational angle at an interval. This is based on the fact that the pattern of distribution represents the characteristic of knocking of the engine.

12 Claims, 29 Drawing Figures

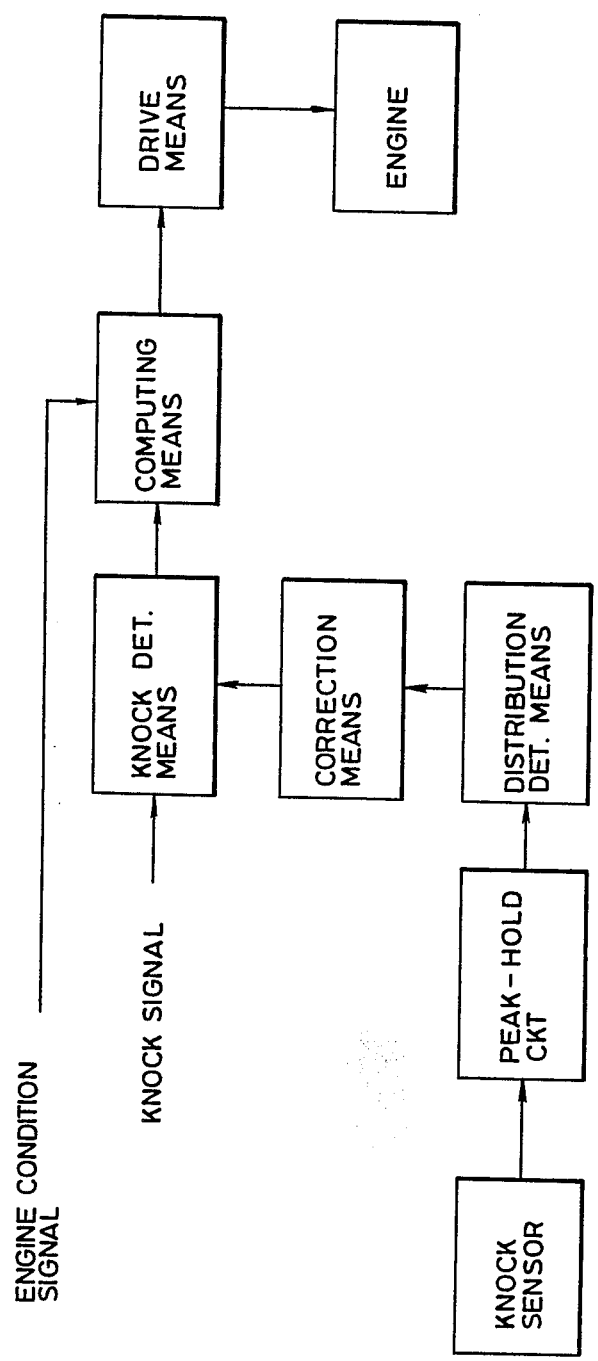

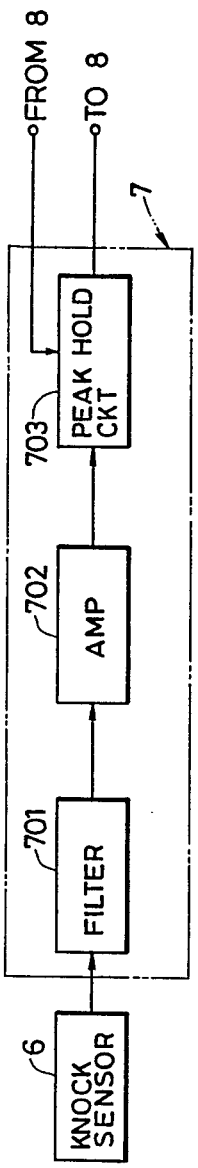
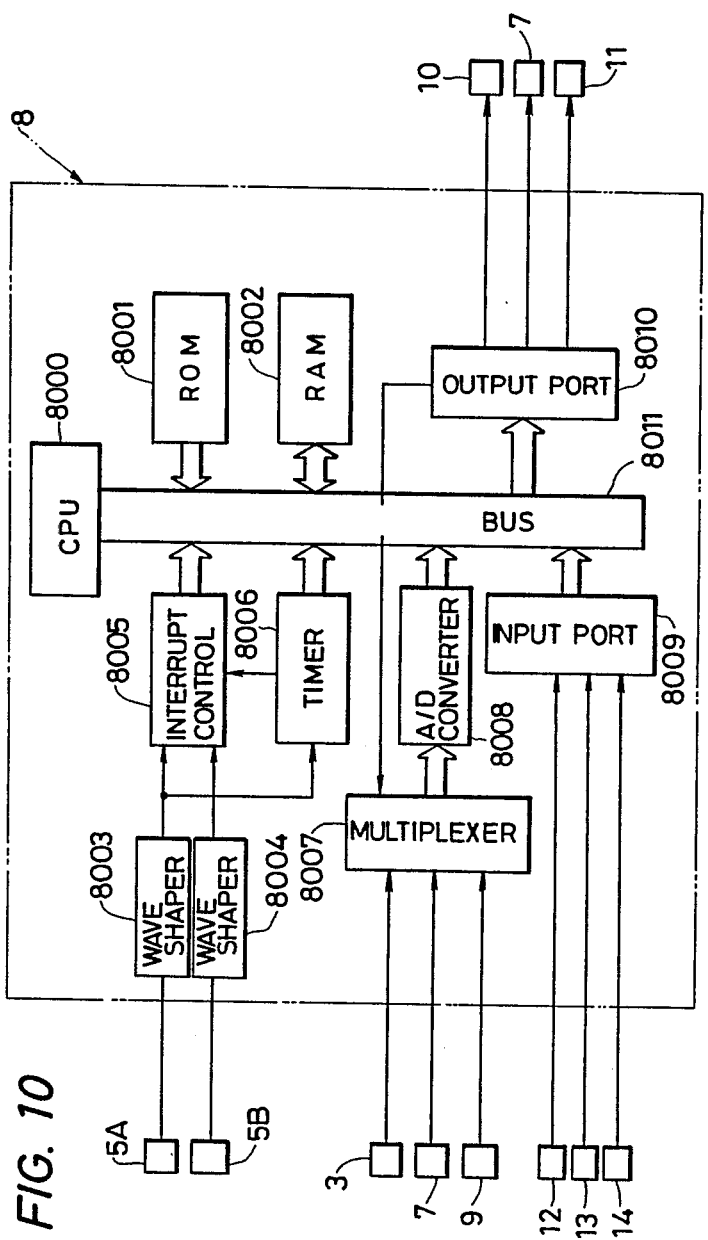
FIG. 9
FIG. 10

ANTI-KNOCKING CONTROL IN INTERNAL COMBUSTION ENGINE

This is a continuation of application Ser. No. 735,108, filed May 17, 1985, now U.S. Pat. No. 4,617,895, issued Oct. 21, 1986.

BACKGROUND OF THE INVENTION

The present invention relates to method and apparatus for controlling an internal combustion engine to prevent the occurrence of knocking.

Various types of anti-knocking control systems to be incorporated with an internal combustion engine have been developed with a view to minimizing the occurrence of knocking concurrently with maximizing the output charactristic of the engine.

Generally, prior art control systems are arranged so as to control ignition timing, air-fuel ratio and the like in accordance with the results of the comparison of the output signal of a knock sensor attached to the engine and a reference established in advance.

To adjust the balance between the maximization of the output characteristic and the knocking prevention, it is the most important that the reference is established adequately in the control, and therefore a number of attempts to meet this requirement have been made hitherto. Such a technique is disclosed in Japanese Laid-Open Patent Application No. 56-115861. However, the prior art systems do not produce satisfactory results for meeting demands imposed in high precise anti-knocking control, because of difficulty of determination of the reference resulting from, for example, mechanical tolerances of engines.

SUMMARY OF THE INVENTION

It is therefore an object of the present invention to provide new method and apparatus for controlling efficiently an internal combustion engine by properly establishing a reference which is used for determining the presence or absence of knocking of the engine.

With this and other objects which will be become apparent as the description proceeds, an anti-knocking control system according to the present invention comprises at least one knock sensor for generating a signal in response to the vibrations of an internal combustion engine, means for repeatedly measuring a predetermined magnitude of the signal generated by the knock sensor within predetermined engine rotational angle at an interval thereby obtaining a plurality of such magnitudes, means for computing a logarithmic transformation value of the measured magnitudes, means for deriving a pattern of distribution of the plurality of logarithmic transformation values, and means for correcting the engine to prevent knocking in accordance with the distribution pattern.

According to a feature of the present invention, the engine is corrected in accordance with a pattern formed by distributing the logarithmic transformation value of the predetermined magnitudes of signal generated by the knocking sensor within a predetermined engine rotational angle at an interval. This is based on the fact that the shape of the distribution represents the characteristic of the vibrations as will be hereinafter described in detail.

According to a further feature of the present invention, the pattern of distribution relative to the logarithmic transformation value of predetermined magnitudes is determined in accordance with the operation performed in relation to the values with respect to given probability points. This technique takes advantage of the characteristic of the distribution pattern affected by the occurrence condition of knocking and results in a simple anti-knocking control system without logarithmic transformation circuit.

According to a further feature of the present invention, the knock sensor comprises a microphone for converting the sound emitted from the engine to a corresponding electrical signal. The output signal of the microphone is supplied, through a band-pass filter for passing only frequency component relative to knocking of the output signals, to a peak-hold circuit for detecting the maximum value. This arrangement makes it possible to meet the requirements imposed in precise knocking detection.

BRIEF DESCRIPTION OF THE DRAWINGS

The object and features of the present invention will become more readily apparent from the following detailed description of the preferred embodiments taken in conjunction with the accompanying drawings in which:

FIG. 7 is a schematic block diagram of an anti-knocking control system according to the present invention;

FIG. 9 is a schematic block diagram of a peak-hold circuit of an anti-knocking control system according to the present invention;

FIG. 10 is a schematic block diagram of a control unit of an anti-knocking control system according to the present invention;

DETAILED DESCRIPTION OF THE INVENTION

Prior to describing the arrangement of an anti-knocking control system according to the present invention, the technical basis of the invention will first be described with reference to FIGS. 1 to 6C.

Figure 1:
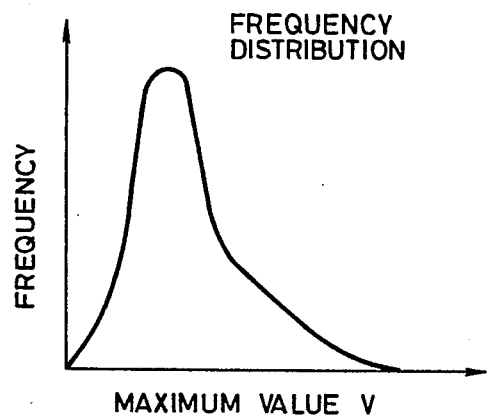
FIG. 1 is a graph showing a frequency distribution patterned in accordance with the signal having the maximum value of signals generated by a knock sensor coupled to an internal combustion engine at predetermined interevals.
Figure 2:
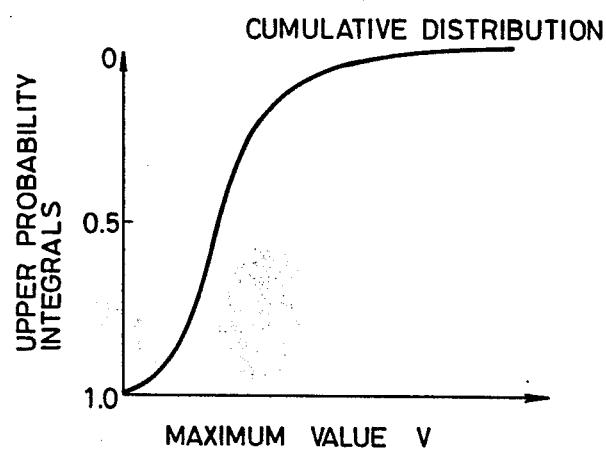
FIG. 2 is a cumulative distribution diagram showing the upper probability integrals with respect to the maximum value of a knock sensor output signal.
Figure 3:
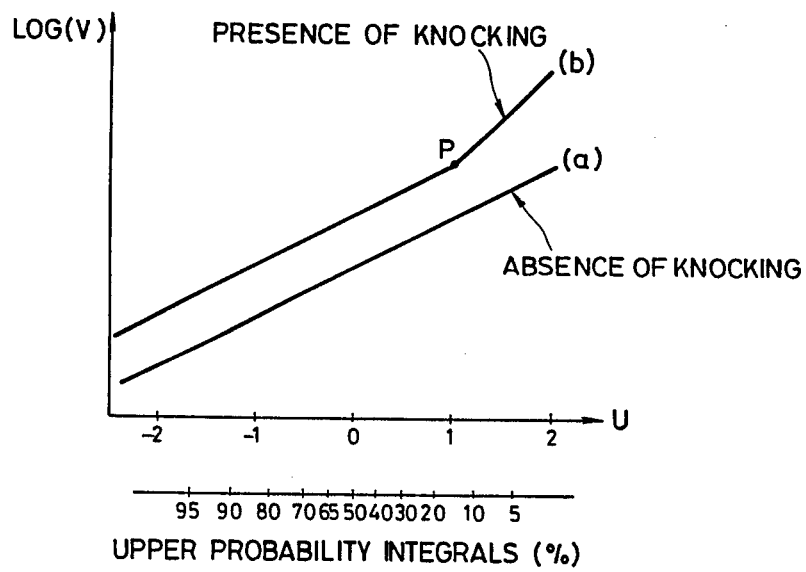
FIG. 3 is a graph showing a distribution of the logarithmic transformation value LOG(V) of maximum value with respect to the ratio u of deflection and standard deviation which is derived from the normal distribution table and the corresponding upper probability integrals.

FIG. 1 illustrates a frequency distribution pattern with respect to the maximum value of signals generated, at an interval, by a knocking sensor coupled to an internal combustion engine and FIG. 2 is a cumulative distribution diagram showing the upper probability integrals with respect to the maximum value of a knock sensor output signal. FIG. 3 is a graph showing a distribution of logarithmic transformation value LOG (V) of the maximum value with respect to the ratio u of a deviation and a standard deviation which ratio is derived from the normal distribution table. This ratio corresponds to the upper probability integrals of the normal distribution (%), which will be hereinafter referred to as upper probability.

The ratio u is defined by the following equation:

$$u = x - \mu/\sigma$$

where:
$x = \mathrm{LOG}\ (V)$
$\mu = \bar{x}$, representing the average of LOG (V)
$\sigma = \sigma(x)$, representing standard deviation of LOG (V)

In the relationship between the above-mentioned equation and FIG. 3, $\sigma$ represents the slope of the line and, if $u=0$, $\mu$ equals to LOG(V).

In FIG. 3, a distribution (a) is obtained when the occurrence of a knocking is absent and a distribution (b) is obtained when the knocking is occured with a certain frequency. Since the distribution (a) is in the form of a single straight line, it is meant that this distribution (a) is of a normal distribution. On the other hand, since the distribution (b) is in the form of two straight lines partitioned at a point of inflexion P, it is meant that this distribution (b) is of a combination of two normal distribution.

The slope of the line (b) up to the point P is approximately equal to that of the line (a) and the slope beyond the point P becomes greater than that of the line (a). The point P moves to the left in the graph as the frequency of the occurrence of the knocking increases. Therefore, the straight line at the right side beyond the point P represents a distribution of LOG(V) resulting from the occurrence of the knocking. As a result, it is possible to determine the occurrence condition of the knocking in accordance with the distribution pattern and this is a technical basis of the present invention.

Figure 4:
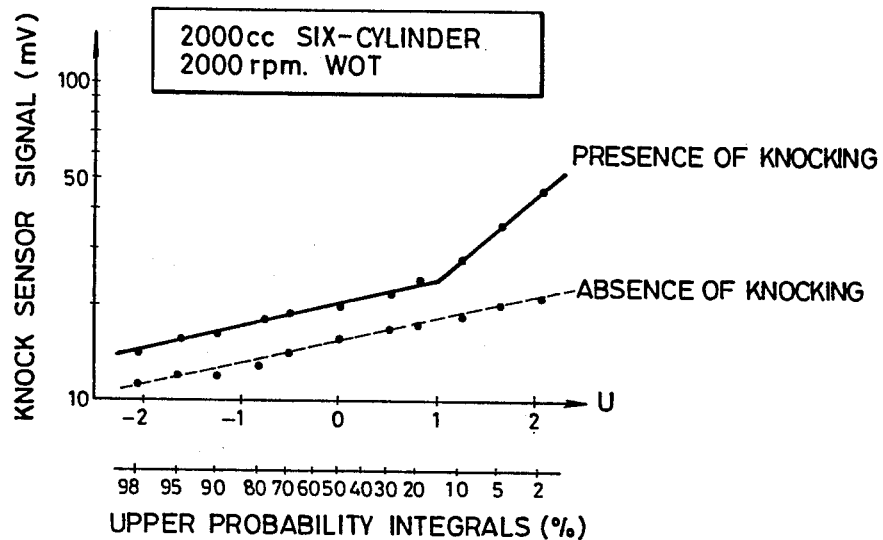
FIG. 4 illustrates a distribution of the logarithmic transformation value of maximum values with respect to the ratio u for a six-cylinder engine.

FIG. 4 illustrates the results of the experiment for a six-cylinder engine. It is seen from the diagram that the distribution pattern is not affected by the type of engine.

However, this results in a costly apparatus because of using logarithmic transformation means and therefore, to illuminate this problem, it is desirable to arrange the apparatus without using a logarithmic transformation circuit.

Figure 5A:
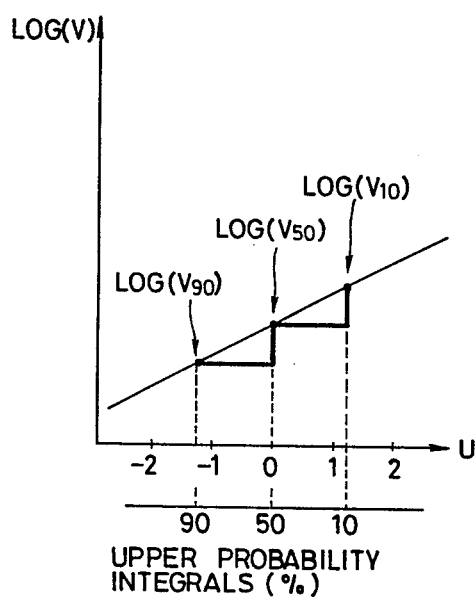
FIG. 5A is a graph showing a distribution of LOG(V) provided in the absence of of knocking.
Figure 5B:
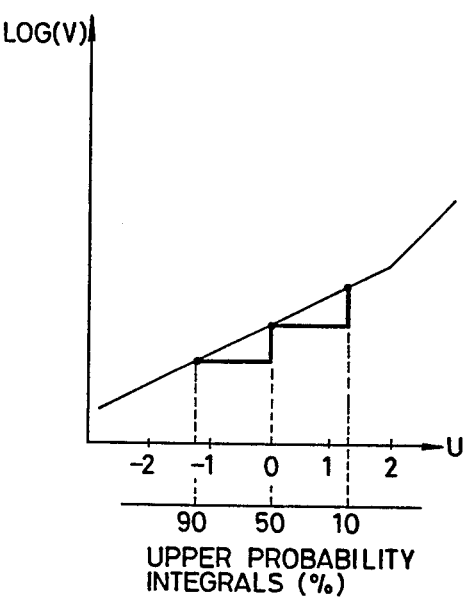
FIG. 5B is a graph illustrating a distribution of LOG(V) obtained when the knocking occurs with low frequency.

FIG. 5A is a graph showing a distribution of LOG(V) provided in the absence of knocking. It is understood from FIG. 5A that the following relation is made up:

$$\mathrm{LOG}(V10) - \mathrm{LOG}(V50) = \mathrm{LOG}(V50) - \mathrm{LOG}(V90)$$

Namely, $$V10/V50 = V50/V90 \tag{1}$$

where:

V10, V50 and V90 respectively represent the maximum values with respect to the upper probability of each of 10%, 50% and 90%.

Figure 5C:
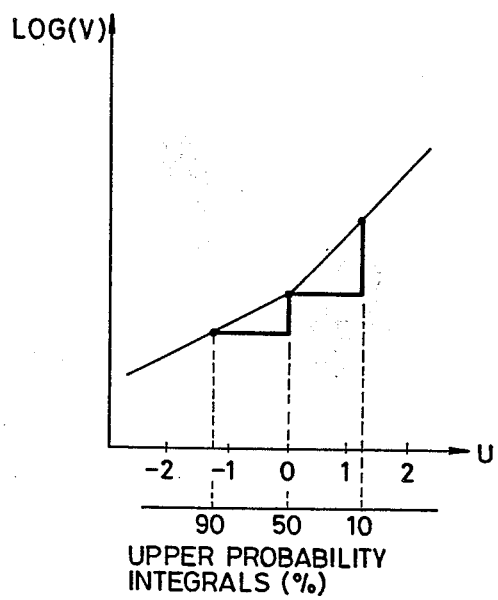
FIG. 5C is a graph illustrating a distribution of LOG(V) provided when the knocking occurs with high frequency.

FIG. 5A illustrates a distribution of LOG(V) obtained when the knocking occurs with low frequency. This condition can also be expressed by the equation (1), however, when the knocking occurs with high frequency as shown in FIG. 5c, the relation is as follows:

$$V10/V50 > V50/V90 \tag{2}$$

Therefore, it is possible to determine the knocking condition in accordance with the equations (1) and (2), that is, when the equation (1) is satisfied, the engine is in a too-small-knocking condition, while, it is in a too-much-knocking condition when the equation (2) is satisfied.

V10, V50 and V90 can be obtained as follows.

For computation of the maximum value V10 with respect to the upper probability 10%, the present maximum value V is first compared with the last obtained V10. If V > V10, the current V10 is given by the following equation:

$$V10 = V10 + 9 \times \Delta V10$$

where: $\Delta V10$ represents a constant provided for the upper side probability 10%, and if V < V10, the current V10 is obtained by the following equation:

$$V10 = V10 - 1 \times \Delta V10$$

Since the ratio between the amount of variation in V10 in the case of V > V10 and the same in the case of V < V10 is set to 9 to 1, the current V10 assumes the value corresponding to an upper probability of 10%. Namely, if V10 is actually the value corresponding to the upper probability 10%, the probability of V > V10 is 0.1 and that of $V<V10$ is 0.9, and therefore the expectation of the variation of $V10$ with respect to $V$ is $9\times 0.1 - 1 \times 0.9 = 0$ and the current value $V10$ is fixed.

On the other hand, if $V10$ is smaller than the value corresponding to the upper probability 10%, for example, if it is the value with respect to the upper probability 20%, the probability of $V>V10$ is 0.2 and that of $V<V10$ is 0.8, and therefore the expectation of the variation of $V10$ is $1.8 - 0.8 = 1$ and $V10$ varies to the increasing direction so as to assume the value corresponding to the upper probability 10%. If $V10$ is greater than the value corresponding to the upper probability 10%, the expectation assumes minus number, and therefore $V10$ varies to the decreasing direction so as to assume the value corresponding to the upper probability 10%.

For the computation of $V50$, the ratio between the constant for $V>V50$ and the constant for $V<V50$ is established to 1, and for the computation of $V90$, the ratio is established to 1/9.

It is desirable that $\Delta V10$, $\Delta V50$ or $\Delta V90$ is established in accordance with the output of the knock sensor. For example, in the case of the establishment of $V50$, $\Delta V50$ is obtained as a mean value using the difference between $V$ and $V50$, that is:

$$\Delta V50 = (3 \times \Delta V50 + |V - V50|)/4$$

and if $V>V50$, $$V50 = V50 + \Delta V50/4$$

if $V<V50$, $$V50 = V50 - \Delta V50/4$$

Using $V10$, $V50$ and $V90$ obtained in the above-mentioned way, $V10/V50$ and $V50/V90$ are respectively computed at an interval, for example, every 128 cycles to correct the knock-determination reference.

When the knocking occurs with low frequency, since the ratio between $V10$ and $V50$ scarcely varies in accordance with engine condition or engine type, it is desirable to correct the knocking determination reference so that the ratio between $V10$ and $V50$ assumes a given value, for example, a value slightly greater than the ratio between $V10$ and $V50$ obtained in the absence of knocking.

Figure 6A:
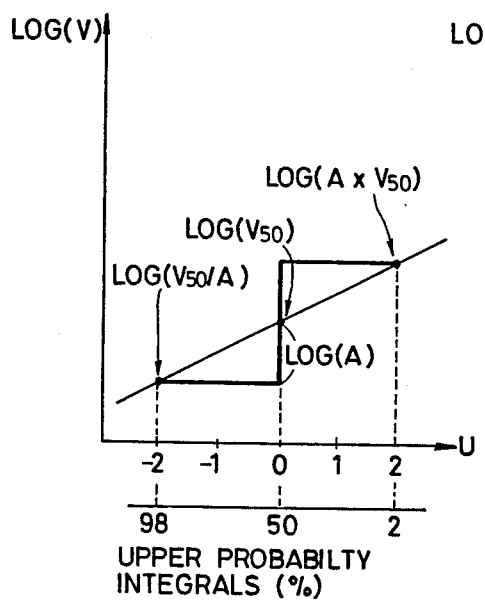
FIGS. 6A to 6C respectively illustrate a distribution of LOG(V) useful for describing the technical basis of the present invention which varies in accordance with the occurring condition of knocking.
Figure 6B:
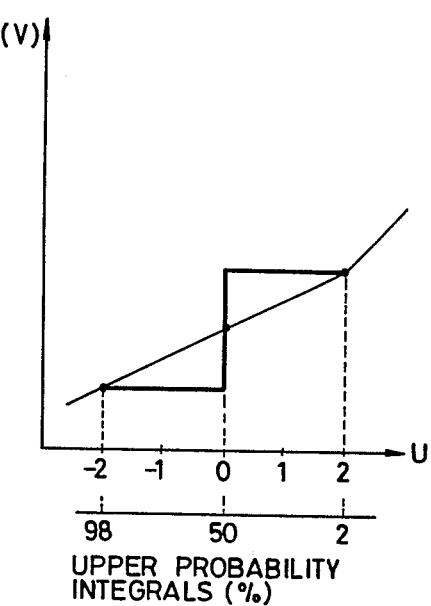

Furthermore, to correct the reference on the basis of the distribution pattern of $LOG(V)$, it is also allowed to utilize the variation of the probabilities of $V>A\times V50$ and $V<V50/A$ resulting from the presence or absence of knocking, wherein $V50$=median and $A$=constant. FIG. 6A illustrates a distribution of $LOG(V)$ obtained when the occurrence of knocking is absent and FIG. 6B shows a distribution of $LOG(V)$ provided when the knocking occurs with low frequency. In these conditions, the distributions have linear patterns within the range of $V50/A < V < A \times V50$ and thus the probability of $V>A\times V50$ is equal to that of $V<V50/A$.

Figure 6C:
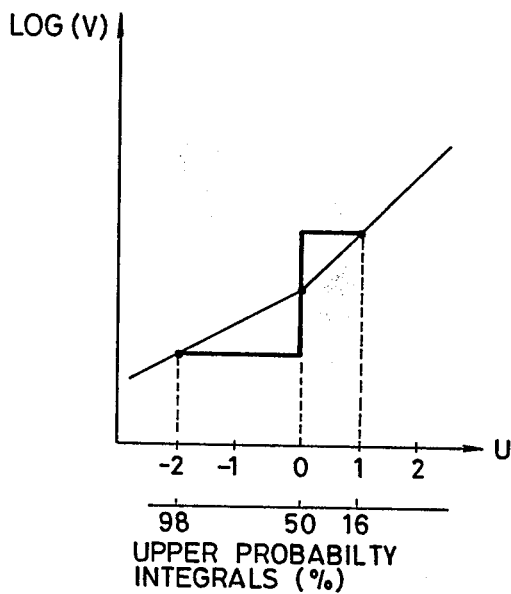

On the other hand, when knocking frequently occurs, the distribution has a pattern as shown in FIG. 6C. The probability of $V>A\times V50$ becomes greater than that of $V<V50/A$. In this case, the probabilities are 16% and 2%. Namely, the occurring condition of knocking can be checked by monitoring the probabilities of $V>A\times V50$ and $V<V50/A$.

Since the probability of $V>A\times V50$ is not affected by engine type or the like, it is also allowed to correct the reference so as to assume a predetermined frequency value, for example, a value slightly greater than the value corresponding to the probability of $V>A\times V50$ obtained when the occurrence of knocking is absent.

The basic reference value can be derived from the value with respect to a predetermined probability, for example, it is obtained by $K \times V50$, wherein $K$=constant.

FIG. 7 is a schematic block diagram of an anti-knocking control system according to the present invention which comprises a knock sensor for generating a signal in response to knocking of an engine, means for determining the presence or absence of knocking by comparing the signal from the knock sensor with a reference, means for controlling the engine through a drive means in accordance with the determination to prevent the occurrence of knocking, peak-hold means for detecting the maximum value of the signal generated from the knock sensor within a predetermined engine rotational angle at an interval, means for measuring the pattern of distribution formed in terms of the logarithmic transformation values of the maximum values, and correction means for correcting the reference in accordance with the measured distribution pattern.

Figure 8:
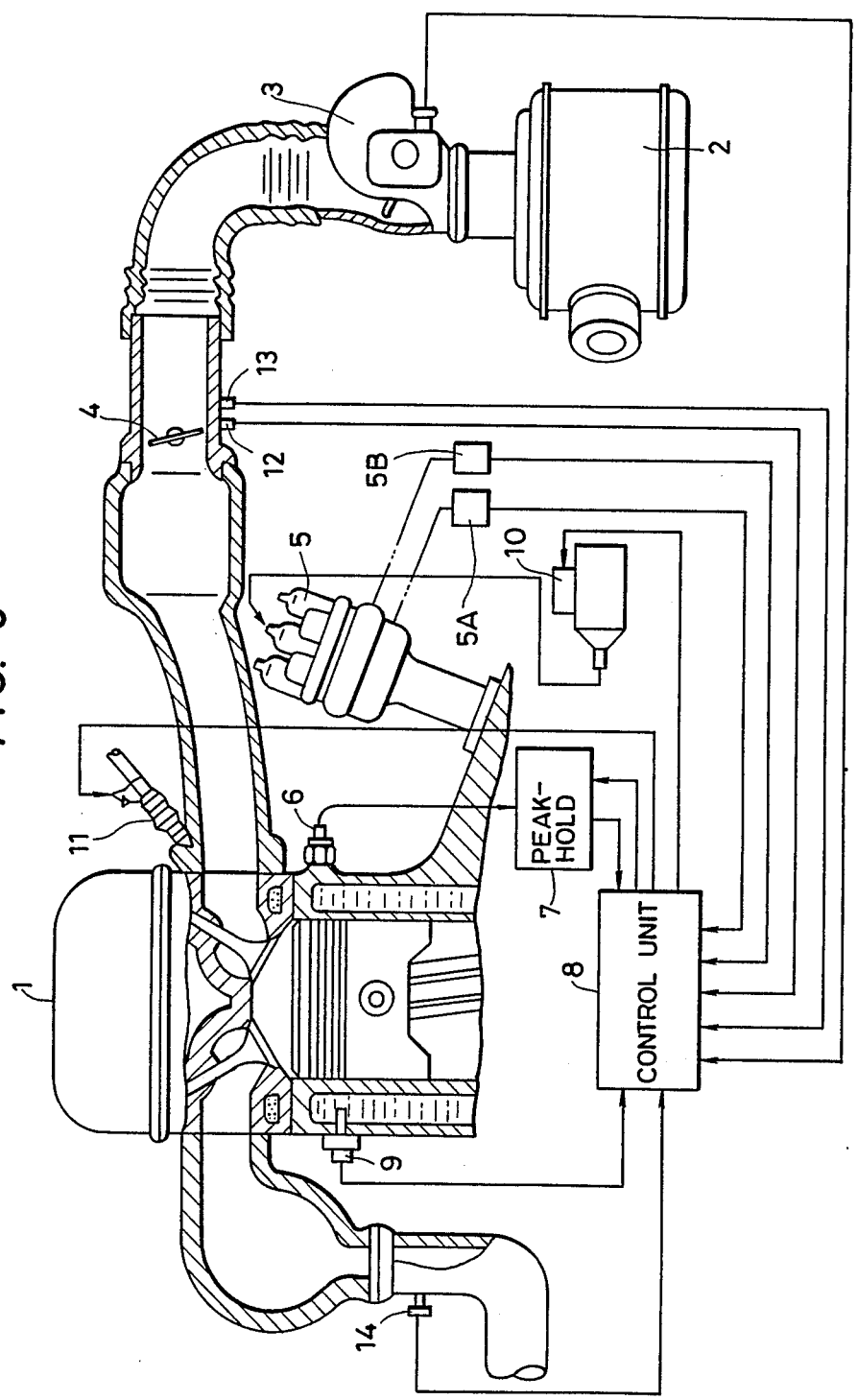
FIG. 8 is a schematic block diagram of an anti-knocking control system according to the present invention incorporated in an internal combustion engine.

FIG. 8 is a schematic diagram of an anti-knocking control system according to the present invention incorporated in an internal combustion engine.

In FIG. 8, a four-cycle four-cylinder internal combustion engine 1 is partially illustrated and is provided with an intake airflow sensor 3 for measuring the flow rate of air taken in through an intake pipe having an air cleaner 2, a throttle valve 4 and an injector 11 for injecting fuel into the engine. An ignition distributer 5 is shown as including a reference angle sensor 5A which generates a pulse responsively to a predetermined angular point advanced with respect to the top dead center and a crank angle sensor 5B which generates a pulse for every rotation of the engine crankshaft. The ignition distributer 5 is associated with an ignitor 10 which is controlled by a signal from a control unit 8. Various sensing devices coupled to the engine 1 are provided for controlling the engine, and include a knock sensor, which will be described hereinafter, an engine coolant temperature sensor 9, throttle position sensors 12 and 13, and an oxygen sensor 14 for generating a signal indicating that the air-fuel ratio of a mixture is either on the rich or lean side of stoichiometry. The output signals of these sensors are supplied to the control unit 8 and the output signal of the knock sensor 6 is fed thereto through a peak-hold circuit 7.

The peak-hold circuit 7 is illustrated in FIG. 9 to comprise a filter 701 for selecting the knocking frequency component from the output signal of the knock sensor 6, a amplifier 702 and holding means 703 for holding the maximum value of the signal from the amplifier 702.

The control unit 8 comprising a microcomputer is shown in detail in FIG. 10.

The microcomputer includes a central processing unit (CPU) 8000 which performs the anti-knocking control in accordance with programmed instructions stored in a read-only memory (ROM) 8001 and using various data necessary for the control stored in a random access memory (RAM) 8002. Digital signals to and from the CPU are carried along a common bus 8011 to which are coupled the associated units including an interrupt control unit 8005 coupled to the reference angle sensor 5A and crank angle sensor 5B through waveform shaping circuits 8003 and 8004 for supplying an interruption signal. The reference angle sensor 5A is also coupled through the waveform shaping circuit 8003 to an 18-bit timer 8006 which counts 1-microsecond clock pulses and which is associated with the interrupt control unit 8005 for the computation of the engine speed. A signal indicative of the crankshaft angular position is derived from the output signals of the sensors 5A and 5B, where the signal is used as a cylinder-switching signal for the peak-hold circuit 7. Also included, in the microcomputer, an A/D converter 8008 for convertion to equivalent digital form from analog signals supplied from the intake airflow sensor 3, peak-hold circuit 7 and engine temperature sensor 9 through a multiplexer 8007. The multiplexer 8007 is controlled by a signal fed through an output port 8010, which is further coupled to the peak-hold circuit 7, ignitor 10 and injector 11 therby to control the change-over of knocking detection among cylinders, ignition timing and air-fuel ratio of a mixture. An input port 8009 is coupled to the throttle position sensors 12 and 13 and oxygen sensor 14 and the output signals thereof are supplied through the bus 8011 to the CPU 8000.

Figure 11:
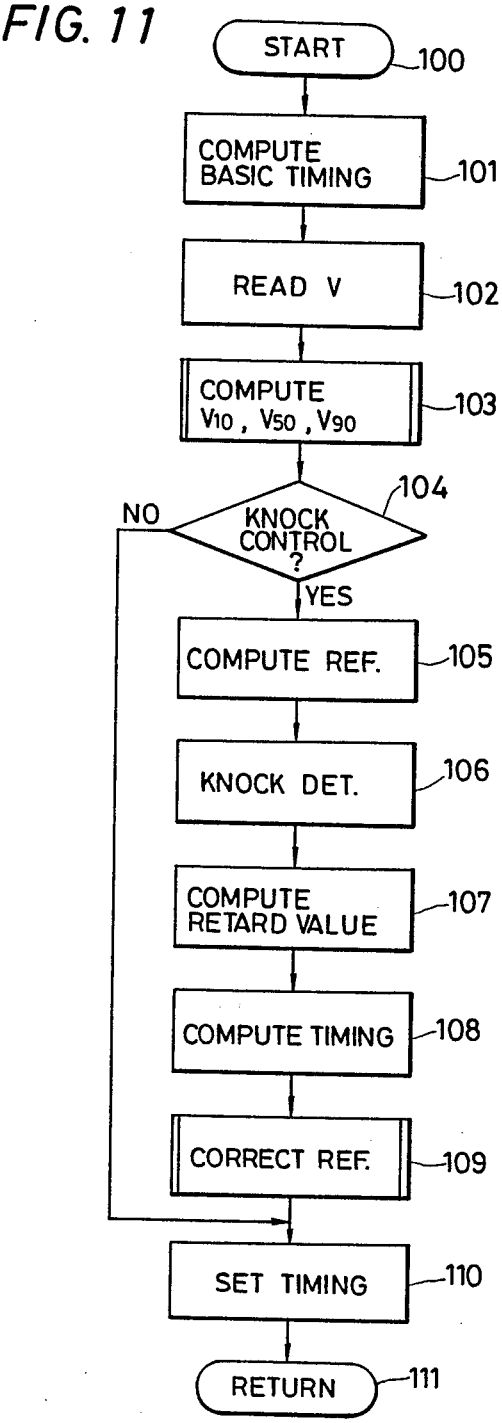
FIG. 11 is a flow chart of the program provided for the microcomputer of the control unit.

FIG. 11 is a flow chart of the program provided for the microcomputer of the control unit 8.

In response to the signal from the interrupt control unit 8005, this routine is started from step 100. A subsequent step 101 follows to derive a basic ignition timing from engine condition such as engine speed Ne, load Q/Ne (Q=intake air amount) and the like. The next step 102 is executed to read the maximum value V of knock sensor output signal generated within a predetermined period for each cylinder, and control goes to a step 103 which will be described hereinafter.

A subsequent step 104 is provided for checking in accordance with the load and the like whether the engine is in a condition where anti-knocking control is necessary. If "NO", control jumps to a step 110 for setting an ignition timing. If "YES", a step 105 is executed to establish a reference Vref used for determining the presence or absence of knocking in accordance with an equation Vref=K×V50. In the next step 106, the presence or absence of knocking is determined by comparing V with Vref. When V>Vref, a flag is set to logic "H" representing the presence of knocking and control goes to the next step 107 to derive the retardation amount required for preventing the occurrence of knocking. An ignition timing is computed in a step 108 in accordance with the derived retardation amount.

A subsequent step 109 is provided for correcting the reference which will be described hereinafter. After setting the computed ignition timing in a step 110, control goes to a return step 111 to return to a main routine.

Figure 12:
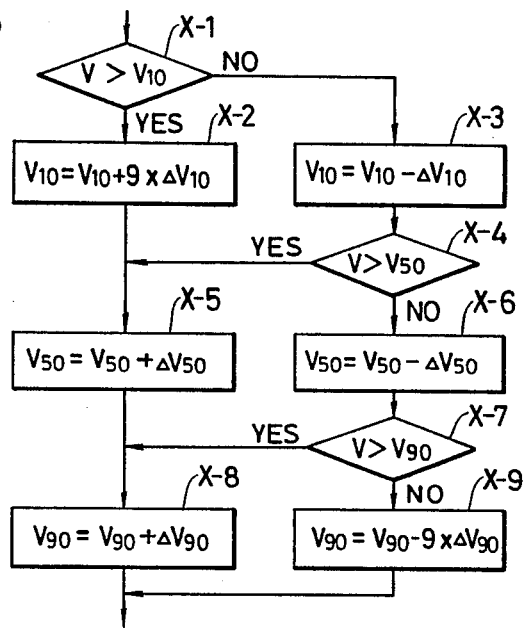
FIG. 12 is a flow chart illustrating an example of detailed steps included in the step 103 of the routine of FIG. 11.

FIG. 12 is a flow chart illustrating an example of steps included in the step 103 of the routine of FIG. 11, which is provided for determining V10, V50 and V90.

In a step X-1, the obtained maximum value V is compared with the last value V10 corresponding to the upper probability 10% which has been stored in RAM. If V>V10, control goes to a step x-2 to execute $V10=V10+9\times\Delta V10$, and if V<V10, a step X-3 is executed so that $V10=V10-\Delta V10$.

A subsequent step x-4 is provided for checking whether V>V50. If "YES", control goes to a step x-5 to determine V50 by the equation $V50=V50+\Delta V50$, and, if "NO", control advances to a step X-6 to determine V50 by the equation $V50=V50-\Delta V50$.

In a step x-7, V is compared with V90. If V>V90, control goes to a step x-8 to execute $V90=V90+\Delta V90$ and, if V<V90, a step x-9 is executed as $V90=V90-9\Delta V90$.

Figure 13:
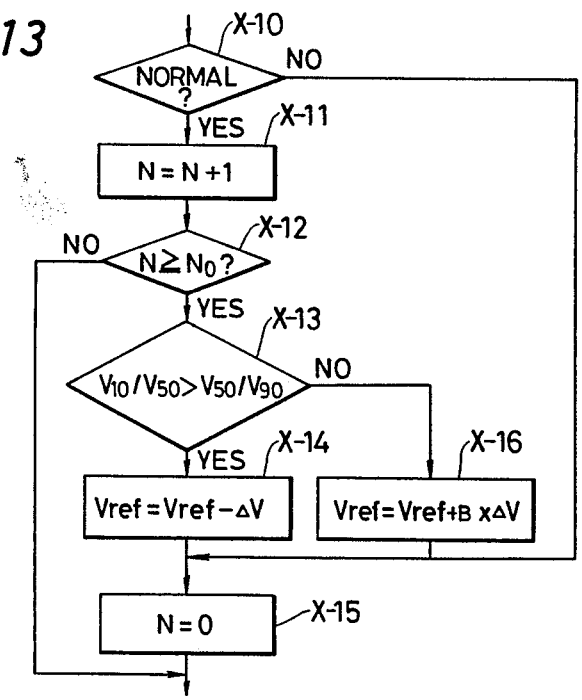
FIG. 13 is a flow chart illustrating an example of detailed steps included in the step 109 of the routine of FIG. 11.
Figure 18C:
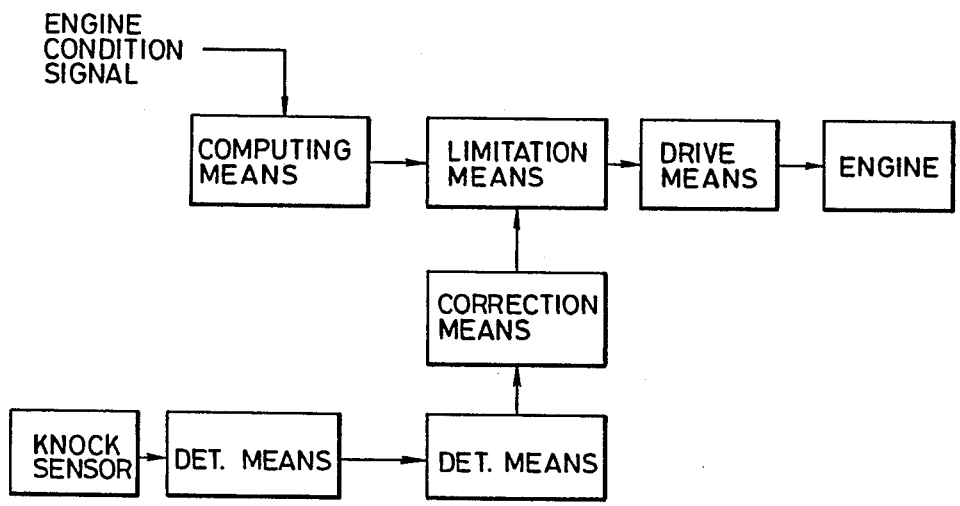
Figure 18D:
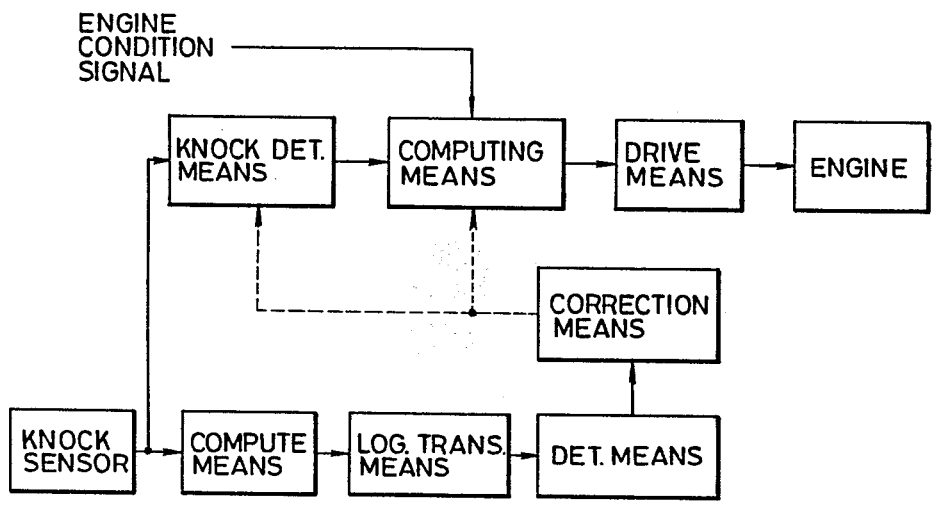

FIG. 13 is a flow chart illustrating an example of steps included in the step 109 of the routine of FIG. 11, which is provided for correcting the knocing determination reference.

A step x-10 checks in accordance with engine speed Ne and load Q/Ne whether the engine is in the normal condition or not. If the engine is not in the normal condition, control jumps to step x-15, and on the other hand, if the engine is in the normal condition, a subsequent step x-11 is executed to count the number of cycles, as $N=N+1$. The next step x-12 checks whether the normal engine condition continues up to a predetermined number No of cycles or not. If "YES", a step x-13 is executed to check whether V10/V50>V50/V90. If "NO", control goes to the step 110 of the routine of FIG. 11. In the step x-13, if "YES", control goes to a step x-14, and then the reference is established as Vref=Vref−ΔV, and if "NO", a step x-15 is executed as $Vref=Vref+B\times\Delta V$. In the above, "B" is a constant which is set to a value greater than 1. In the next step x-16, the counter is reset to zero.

When Vref is increased, the correction value B×ΔV is established so as to become greater than the value ΔV for decreasing Vref. Therefore, Vref is corrected to the increasing direction.

Figure 14:
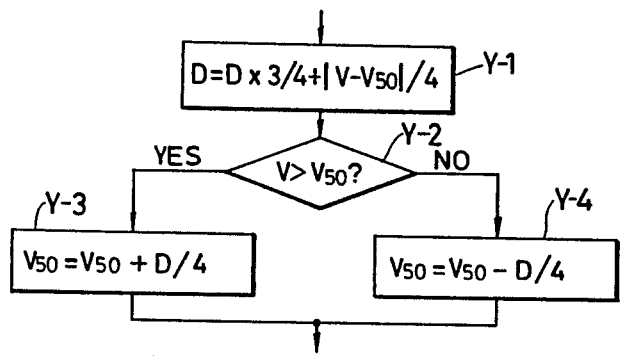
FIG. 14 is a flow chart illustrating a second example of detailed steps included in the step 103 of the routine of FIG. 11.

FIG. 14 is a flow chart illustrating a second example of steps included in the step 103 of the routine of FIG. 11 for deriving the median V50.

A step Y-1 is provided for deriving a mean value D of the absolute value of the difference between V50 and V obtained at every one cycle from the equation $D=D\times\frac{3}{4}+|V-V50|/4$. A subsequent step Y-2 checks whether V>V50. If "YES", control goes to a step Y-3 to determine V50 as $V50=V50+D/4$. If "NO", a step Y-4 is executed to determine as $V50=V50-D/4$. Therefore, V50 assumes a median. Because of using the mean value D of the absolute value of the difference between V and V50, when the engine is in a transient state, a sharp variation of V50 is made so that V50 quickly reaches the median, and on the other hand, when the engine is in the normal condition, a slight variation is made to stabilize V50.

Figure 15:
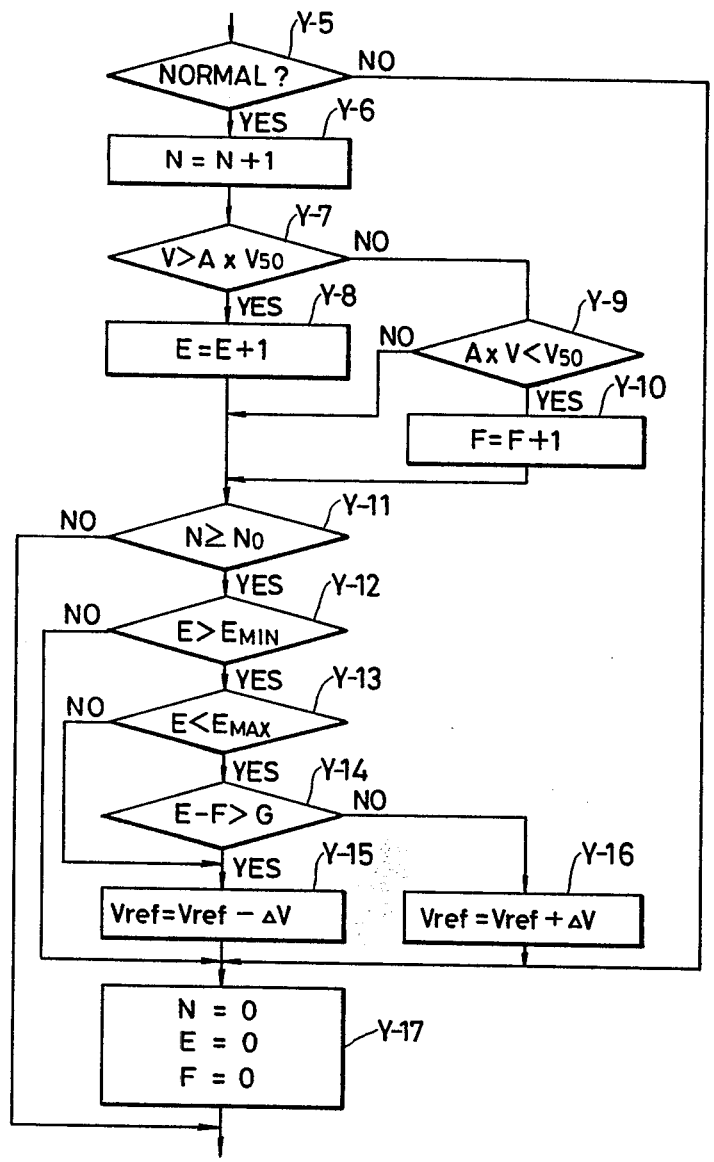
FIG. 15 is a flow chart illustrating a second example of detailed steps included in the step 109 of FIG. 11.

FIG. 15 is a flow chart illustrating a second example of steps included in the step 109 of FIG. 11 in which the median V50 is used.

A step Y-5 is provided for checking whether the engine is in the normal condition or not. If "YES", the cycle counter counts up in a step Y-6 so that the number of cycles assumes $N=N+1$. If "NO", control goes to a step Y-17 to initialize various counters.

After the execution of the step Y-6, a step Y-7 follows to check whether V>A×V50. If "YES", control flows to a step Y-8 to count up as $E=E+1$ and the step Y-8 is followed by a step Y-11. A count of counter E is incremented by one when V exceeds A×V50. On the other hand, if "NO", control goes to a step Y-9 to check whether A×V<V50, and if "YES", a step Y-10 follows to count up as $F=F+1$ and then the step Y-11 is executed. If "NO" in the step Y-9, the step Y-11 is also executed.

In the step Y-11, it is checked whether the number n of cycle exceeds a predetermined number No or not. If "NO", control goes to the step 110 of FIG. 11. If "YES", a subsequent step Y-12 follows to check whether the count E, incremented by one whenever V exceeds A×V50, is greater than a predetermined value $E_{MIN}$. If so, a step Y-13 is executed, and if not, control goes to the step Y-17. Namely, when $E<E_{MIN}$, the knocking determination reference is not corrected.

The step Y-13 checks whether E is below a predetermined value $E_{MAX}$. If E is below the predetermined value $E_{MAX}$, the next step Y-14 is executed, and if not, control goes to a step Y-15. The step Y-14 check whether E−F is greater than a predetermined value G. If "YES", control advances to the step Y-15, and if "NO", control goes to a step Y-16. In the step Y-15, the reference Vref is decreased as $Vref=Vref-\Delta V$, and, in the step Y-16, Vref is increased by $\Delta V$. After the execution of the step Y-15 or Y16, the step Y-17 which is followed by the step 110 of FIG. 11 is executed to initialize each counter.

As described above, if "NO" in the step Y-13, the reference Vref is reduced irrespective of the determination of the step Y-14. This is based on the fact that the value E assumes an extremely great value when the knocking occurs with high frequency. In the step Y-14, E−F is compared with a threshold value G greater than zero. This is executed for the purpose of correcting or increasing the reference value Vref when the knocking occurs with low frequency. Generally, A assumes 2.

Figure 16:
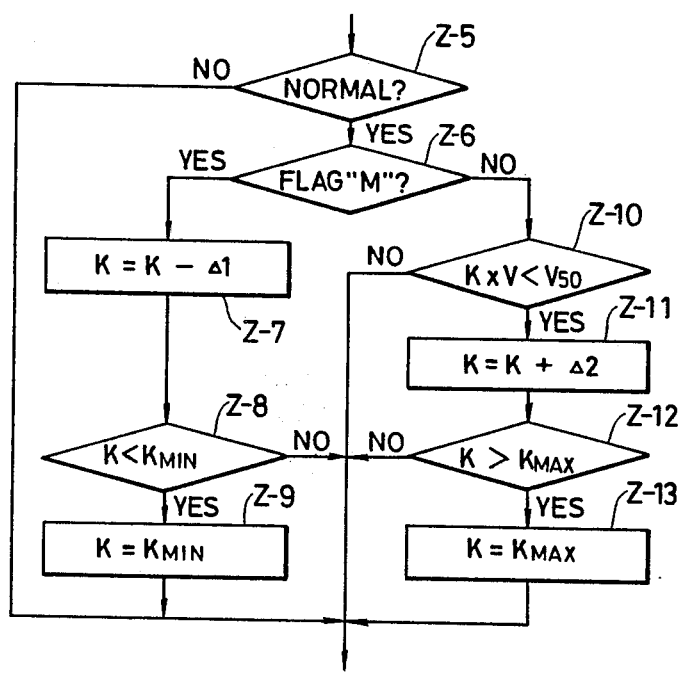
FIG. 16 is a flow chart showing a third example of detailed steps included in the step 109 of FIG. 11.

FIG. 16 is a flow chart illustrating a third example of steps included in the step 109 of FIG. 11.

In this case, the reference Vref is determined as Vref=K×V50 and the K is corrected in accordance with the probability of V>Vref and the probability of V<V50/K.

A step z-5 is provided for checking whether the engine is in the normal condition or not. If "NO", control goes to the step 110 of FIG. 11. If "YES", the next step z-6 is executed to check whether the knock flag has been set to logic "H", that is, whether V>K×V50. If "YES" in the step z-6, control flows to a step z-7 and, if "NO", a step z-10 is executed. In the step z-7, K is decreased as $K=K-\Delta 1$, and the next step z-8 follows to check whether K is below a predetermined value $K_{MIN}$ or not. If K is below the predetermined value, control goes to a step z-9 to establish K to $K_{MIN}$. If not, control goes to the step 110 of FIG. 11.

The step z-10 is provided for checking wether K×V<V50. If "NO", control goes to the step 110 of the routine of FIG. 11. If "YES", a subsequent step z-11 is executed to increase K by $\Delta 2$. The next step z-12 checks whether K exceeds a predetermined value $K_{MAX}$ or not. If "NO", control goes to the step 110 of the routine of FIG. 11. On the other hand, if "YES", a step z-13 follows to establish K as $K_{MAX}$.

The correction value $\Delta 2$ in the step z-11 is set to be slightly greater than the correction value $\Delta 1$ in the step z-7. For example, $\Delta 1=1/32$ and $\Delta 2=1/16$. When knocking occurs with low frequency, the probability of V>K×V50 is equal to the probability of V<V50/K. In this case, however, the reference is corrected so as to become greater than before. Generally, the initial value of K is 2.

Figure 17:
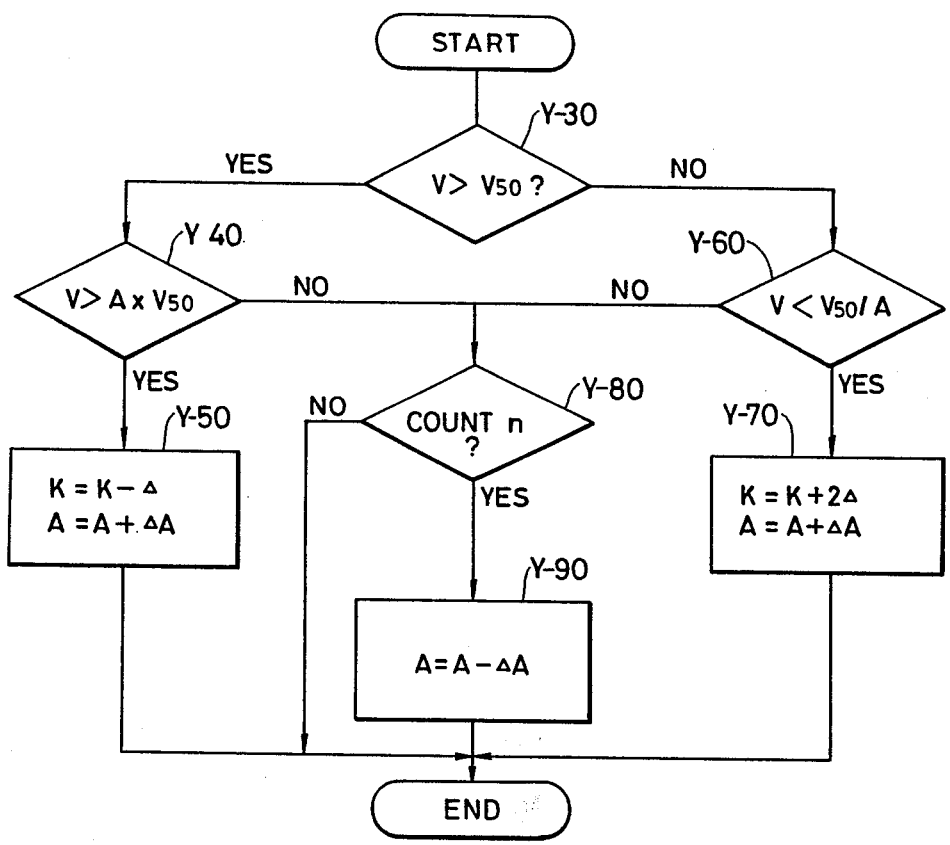
FIG. 17 is a flow chart describing a further method for correcting a reference value used for determining the presence or absence of knocking.

FIG. 17 is a flow chart describing further operation for correcting a reference value used for determining the presence or absence of knocking.

In the above-mentioned routine for correcting the reference level, if V>A×V50, the reference level is decreased, and if V<V50/A, it is increased. However, it is desirable that A is also varied in accordance with the distribution pattern and this results in more precise anti-knocking control.

In the routine shown in FIG. 17, a step Y-30 is provided for checking whether V>V50. If "YES", control goes to a step Y-40 to check whether V>A×V50. If "YES" in the step Y-40, a step Y-50 is executed to increase A as $A=A+\Delta A$ (K is decreased). If "NO" in the step Y-40, control goes to a step Y-80. On the other hand, in the step Y-30, if "NO", control goes to a step Y-60 to check whether V<V50/A. If "YES" in the step Y-60, a step Y-70 is executed to increase A in the same manner (K is also increased). If "NO" in the step Y-60, control goes to the step Y-80.

In the step Y-80, when the step Y-40 or Y-60 is not in the condition of V>A×V50 or V<V50/A during n ignition cycles, A is reduced by $\Delta A$ in the next step Y-90.

Assuming that n is 8, the reference value approximately assumes the value corresponding to the upper probability 95%. Accordingly, the probability of the occurrence of knocking assumes 5%.

FIGS. 18A to 18D are schematic block diagrams showing further anti-knocking control systems according to the present invention.

Figure 18A:
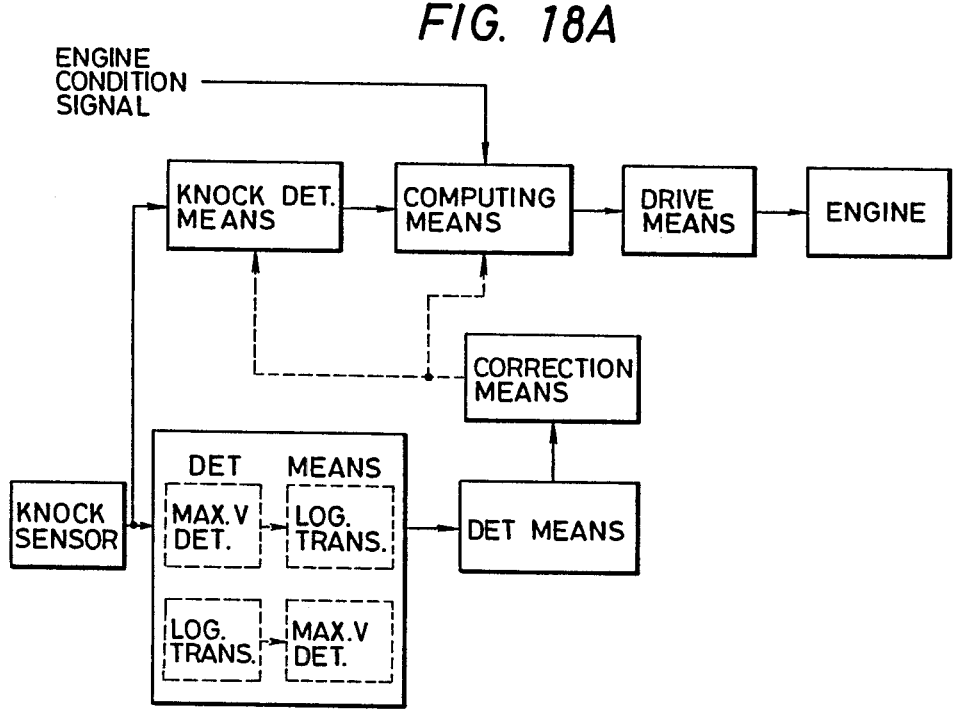
FIGS. 18A to 18D are schematic block diagrams showing further anti-knocking control systems according to the present invention.
Figure 18B:
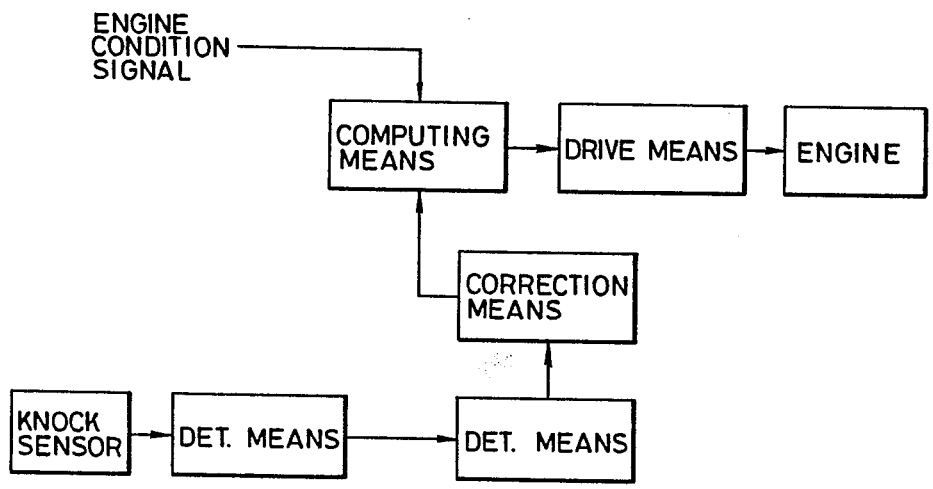

The anti-knocking system shown in FIG. 18A is arranged to control the reference or engine control factor such as ignition timing in accordance with a signal from the correction means and includes a peak-hold circuit having a logarithmic transformation circuit. The anti-knocking control system shown in FIG. 18B is arranged to directly control the engine control factor in accordance with the signal from the correction means without correcting the reference. The control system illustrated in FIG. 18C includes means for limiting the control value to a predetermined range, and the reference value for the limitation is corrected in accordance with a signal from the correction means. Furthermore, the control system illustrated in FIG. 18C has means for producing the mean value of the output signals generated by the knock sensor and means for obtaining the logarithmic transformation of the mean value of the output signals.

Figure 19:
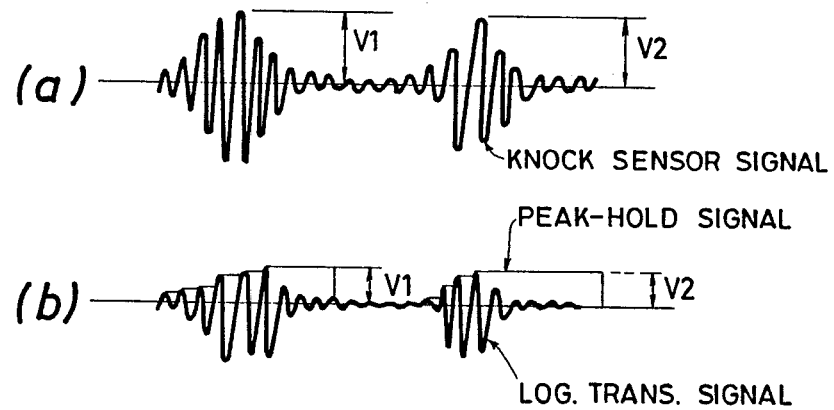
FIG. 19 is a waveform diagram useful for describing the peak-hold operation.

FIG. 19 is a waveform diagram useful for describing the peak-hold operation. In FIG. 19, signal (a) is the output signal of the knock sensor and signal (b) is the logarithmic transformation signal of the output signal. The references v1 and v2 of the signal (b) represent the logarithmic transformation values corresponding to the maximum values V1 and V2 of the signal (a), and these signals are supplied to the control unit as peak-hold signals. The peak-hold circuit 7 is controlled by the control unit 8 so as to perform the peak-hold operation at intervals of 10°CATDC to 90°CATDC.

Figure 20:
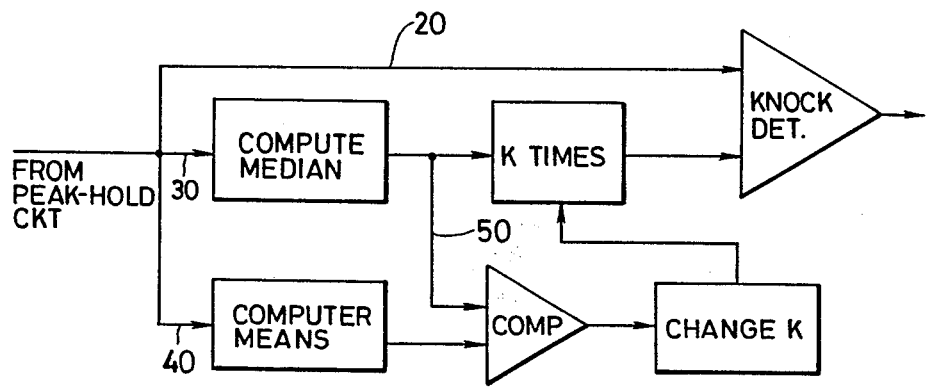
FIG. 20 is a schematic block diagram showing means for finding the distribution pattern of the logarithmic transformation value LOG(V) which is incorporated in the control unit.

FIG. 20 is a schematic block diagram showing means for finding the distribution pattern of the logarithmic transformation value LOG(V) where the means is incorporated in the control unit.

In FIG. 20, the peak-hold signal is supplied to a knocking determination circuit, median computing circuit and mean value computing circuit through lines 20, 30 and 40. The derived median is used for establishing a knocking determination reference, and the output signal of the median computing circuit is supplied to a comparison circuit through a line 60 to correct the reference. The reference value is determined by multiplying the median value by a constant K. On the other hand, the derived mean value is compared with the median value fed through the line 60, and in accordance with the results of the comparison, the constant K is increased or decreased to correct the reference value. Namely, this is a method for correcting the reference value in accordance with the comparison between the median and mean.

Figure 21:
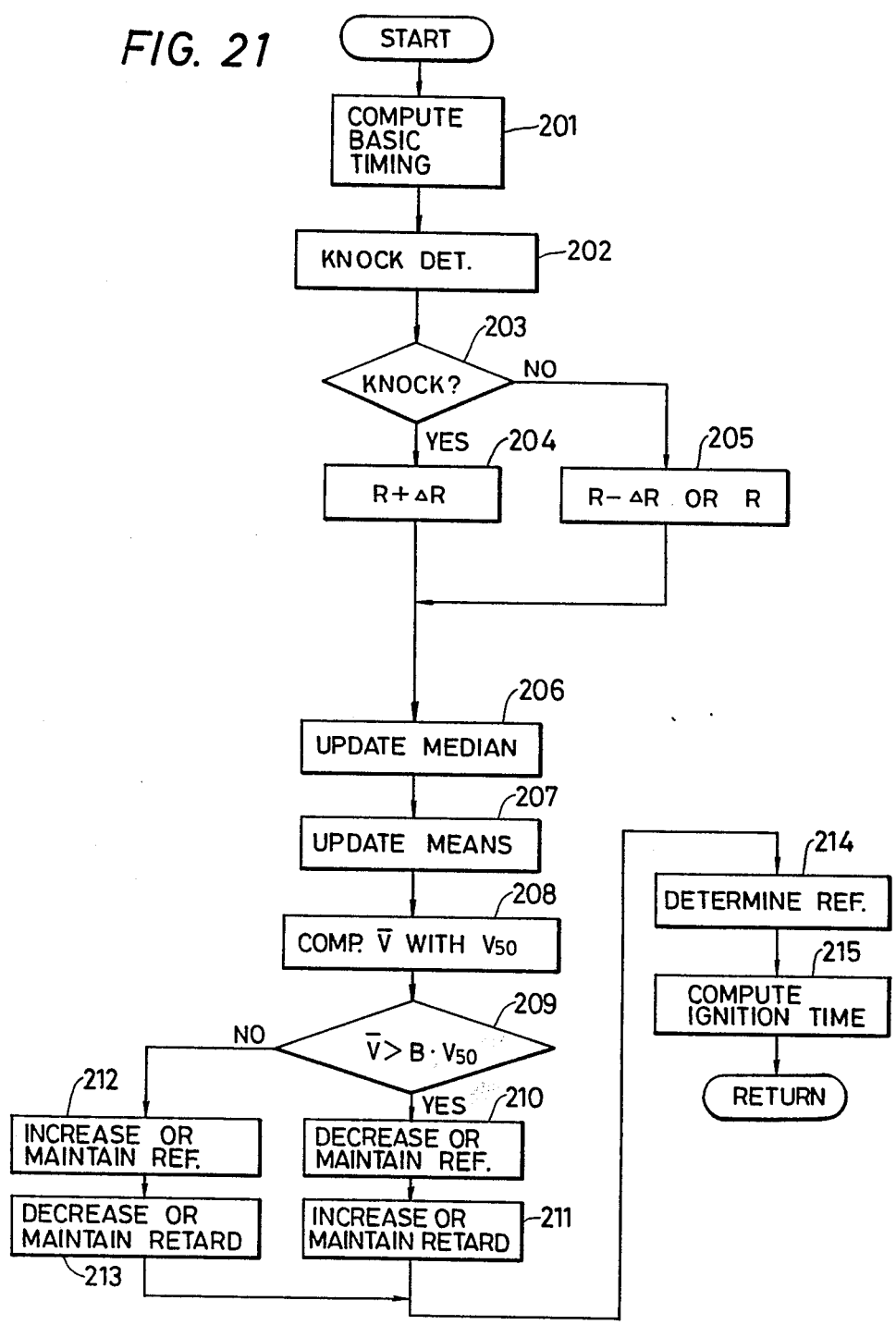
FIG. 21 is a flow chart illustrating the operation programed for correcting the reference in accordance with the comparison of the median and mean.

FIG. 21 is a flow chart illustrating the operation programed for correcting the reference in accordance with the comparison between the median and mean.

A step 201 is provided for deriving a basic ignition timing from engine speed, intake air pressure and the like, and the next step 202 is provided for determining the presence or absence of knocking by comparing a knock sensor signal with a reference value. This reference value is established by multiplying the median v50 of a distribution of LOG(V), i.e., the value of cumulative distribution 50%, by a constant K. In a subsequenct step 203, if the engine is in the knocking condition, a step 204 is executed to additionally retard the basic ignition timing by $\Delta R$ (generally, about 0.5 to 1°CA). If not, a step 205 is executed to reduce a retardation value R by $\Delta R$ ($R = R - \Delta R$) when the number of ignitions without knocking exceeds a predetermined value and to maintain the retardation value R when it does not exceed.

A subsequent step 206 is provided for updating the median. Assuming that character M represents the actual median and v50 represents a median obtained by computation, then v50 is increased by $\Delta v50$ when an input signal v is greater than v50, and on the other hand, v50 is decreased by $\Delta v50$ when the input signal is less than v50. Since the probability of a value smaller than the median is equal to the probability of a value greater than the median, that is, they are both 50%, if v50=M, the probability of v>v50 is equal to the probability of v<v50. However, if v50 is smaller than M, the probability of v>v50 is increased and therefore the frequency of increasing V50 by $\Delta$V50 becomes high, and on the other hand, if v50>M, the probability of V<V50 is increased and therefore the frequency of decreasing v50 by $\Delta$v50 becomes high. Accordingly v50 approaches the actual median M as v50 is updated repeatedly. This method just requires a simple construction having only one RAM. In this case, however, the median, mean value and reference value are respectively established per cylinder for performing more accurately determination of knocking condition. Therefore, a plurality of RAMs as many as the number corresponding to the number of cylinders may be required.

A step 207 is provided for updating the mean value of input signals v (=LOG V). The mean value can be established in accordance with a well known method, for example the median $\bar{v}$ may be obtained every ignition by an equation $\bar{v} = (7\bar{v} + v)/8$.

A subsequent step 208 is executed to compare the mean value $\bar{v}$ with the median v50. In the next step 209, if $\bar{v} \geq B \times v50$ (B=a constant, about 1.1), a step 210 is executed, and if $\bar{v} < B \times v50$, control goes to a step 212. Namely, the step 210 is executed when the knocking occurs with high frequency. When $\bar{v} \geq B \times v50$, the current reference value is too great, resulting in difficult detection. When this condition has been continued over a predetermined period of time, the constant K is reduced to lower the reference level. This results in the correction of the suitable reference level caused by the error of computation. Furthermore in the step 210, the correction is not performed when the engine is in the transient condition so as to accurately check the presence or absence of knocking.

A subsequent step 211 is provided for reducing the reference value concurrently with retarding the ignition timing when the reference level is too high. Namely, when the too-high reference level has been found, the engine is already in the knocking condition and therefore it is required to retard the ignition timing. This also results in the preventation of overshooting and undershooting of the reference correction. Furthermore in the step 210, when the retardation value reaches a predetermined maximum value, the limitation for the maximum retardation value is lightened. Namely, the maximum retardation value Rmax is further retarded as necessary to meet the requirements of the anti-knocking control.

In the step 209, if $\bar{v} < B \times v50$, control goes to steps 212 and 213 to increase the reference value and to advance the ignition timing. However, in the step 212, when the retardation value R is approximately zero, the reference is not increased.

A subsequent step 214 is provided for newly determining a reference value by multiplying the corrected K by the updated v50. This reference is determined for every cylinder and used for determining the presence or absence of knocking in the following ignition cycle. In the next step 215, an ignition timing is derived from the retardation value and basic ignition timing.

Figure 22:
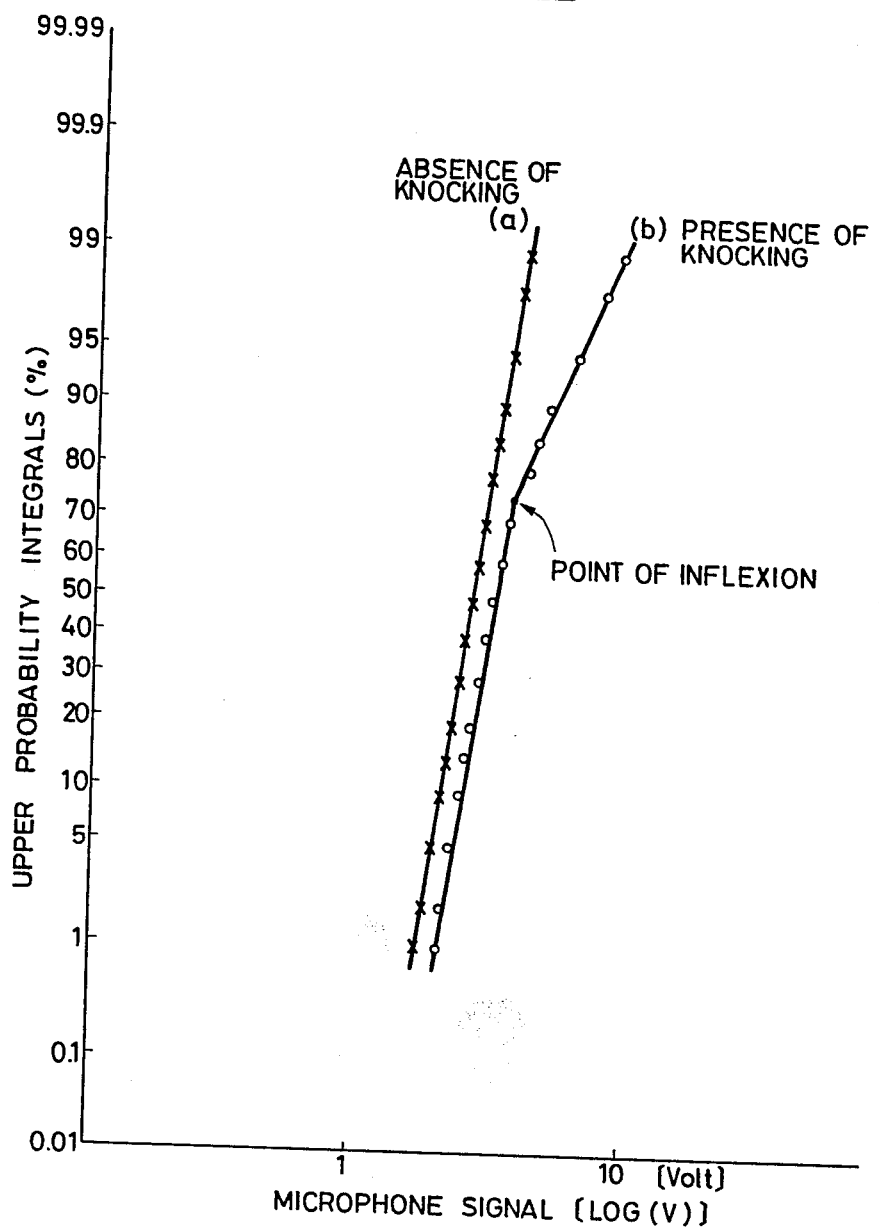
FIG. 22 is a diagram showing a distribution of the logarithmic transformation value of the output signal generated from a microphone.

Turning back to FIG. 8, generally, the sensor of piezoelectric type or electromagnetic type is used as a knock sensor 6 for measuring vibrations of the engine. However, in this case, because the sensor 6 is attached to the engine as shown in the diagram, a plurality of sensors are required to meet the requirements imposed in precise knocking detection. A reason for this is that the vibrations of the portions remote from the sensor cannot be detected completely. This results in a costly system and therefore attempts to use a microphne as a knocking sensor have been made as is described in Japanese Laid-open Application No. 51-46606. However, due to the reduction of S/N ratio, it has not been perfected to the point where it can be utilized in the applications. Now, this problem is eliminated by employing the microphone for the above-mentioned anti-knocking control system according to the present invention. FIG. 22 is a distribution diagram with respect to the maximum value of signal obtained from the microphone. It is seen from the diagram that the microphone is useful for the anti-knocking control.

It should be understood that the foregoing relates to only preferred embodiments of the invention, and that it is intended to cover all changes and modifications of the embodiments of the invention herein used for the purposes of the disclosure, which do not constitute departures from the spirit and scope of the invention. For example, although in the foregoing description the logarithmic transformation is performed using a logarithmic transformation circuit, the same transformation can be effected using a logarithmic transformation table stored in the ROM of the microcomputer. Furthermore, although the distribution pattern of LOG(V) is checked to correct a reference value, however, it is also possible to correct the same in accordance with the distribution pattern of LOG Vmean, wherein Vmean=the mean value of knock sensor signals.

What is claimed is:

1. Apparatus for controlling knocking in an internal combustion engine, comprising:

a knock sensor for generating a signal in response to the vibrations in said engine;

means for measuring a predetermined magnitude of said knock sensor signal generated within a predetermined engine rotational angle at an interval thereby obtaining a plurality of said magnitudes;

means for determining a pattern of distribution of a plurality of logarithmic values corresponding to said plurality of magnitudes; and means to control said engine to prevent said knocking in accordance with said distribution pattern.

2. Apparatus is claimed in claim 1, wherein said knocking sensor comprises a microphone for converting a sound emitted from said engine to a corresponding electrical signal and a band-pass filter for passing only frequency component relating to knocking of said knock sensor signal.

3. Apparatus as claimed in claim 1, wherein said engine control means comprises means for controlling the ignition timing of said engine.

4. Apparatus as claimed in claim 1, wherein said engine control means comprises means for controlling the air-fuel ratio of mixture to be supplied to said engine.

5. Apparatus as claimed in claim 1, wherein said predetermined magnitude is a maximum value.

6. Apparatus as claimed in claim 1, wherein said predetermined magnitude is a mean value.

7. Apparatus for controlling knocking in an internal combustion engine, comprising:

a knock sensor for generating a signal in response to the vibrations in said engine;

means for determining the presence of knocking by comparing said knock sensor signal with a reference;

means for controlling said engine to prevent said knocking in accordance with the determination;

means for measuring a predetermined magnitude of said knock sensor signal generating within a predetermined engine rotational angle at an interval thereby obtaining a plurality of said magnitudes;

means for determining a pattern of distribution of a plurality of logarithmic values corresponding to said plurality of magnitudes; and means for correcting said reference in accordance with said distribution pattern.

8. Apparatus as claimed in claim 7, wherein said knocking sensor comprises a microphone for converting a sound emitted from said engine to a corresponding electrical signal and a band-pass filter for passing only frequency component relating to knocking of said knock sensor signal.

9. Apparatus as claimed in claim 7, wherein said engine control means comprises means for controlling the ignition timing of said engine.

10. Apparatus as claimed in claim 7, wherein said engine control means comprises means for controlling the air-fuel ratio of mixture to be supplied to said engine.

11. Apparatus as claimed in claim 7, wherein said predetermined magnitude is a maximum value.

12. Apparatus as claimed in claim 7, wherein said predetermined magnitude is a mean value.

* * * * *